United States Patent
Bonhôte et al.

(10) Patent No.: US 7,194,798 B2
(45) Date of Patent: Mar. 27, 2007

(54) METHOD FOR USE IN MAKING A WRITE COIL OF MAGNETIC HEAD

(75) Inventors: Christian René Bonhôte, San Jose, CA (US); Quang Le, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 464 days.

(21) Appl. No.: 10/881,559

(22) Filed: Jun. 30, 2004

(65) Prior Publication Data

US 2006/0000080 A1    Jan. 5, 2006

(51) Int. Cl.
*G11B 5/127*    (2006.01)
*B44C 1/22*     (2006.01)
*C25D 5/02*     (2006.01)

(52) U.S. Cl. .............. 29/603.25; 29/603.16; 29/603.18; 29/603.23; 29/603.24; 216/22; 216/47; 216/48; 216/87; 205/118

(58) Field of Classification Search ........... 29/603.25, 29/603.16, 603.18, 603.23, 603.24; 216/22, 216/47, 48, 87; 205/118, 119, 120–122; 360/126, 317, 119–121; 430/320, 314

See application file for complete search history.

(56) References Cited

U.S. PATENT DOCUMENTS

| | | | |
|---|---|---|---|
| 5,972,193 A * | 10/1999 | Chou et al. | 205/122 |
| 6,111,724 A * | 8/2000 | Santini | 360/126 |
| 6,323,127 B1 | 11/2001 | Andricacos et al. | |
| 6,356,410 B1 * | 3/2002 | Chesnutt et al. | 360/126 |
| 6,461,888 B1 * | 10/2002 | Sridhar et al. | 438/52 |
| 6,537,461 B1 | 3/2003 | Nakahara et al. | |
| 2001/0006245 A1 | 7/2001 | Yunogami et al. | |
| 2003/0189786 A1 | 10/2003 | McGeehin et al. | |
| 2003/0205553 A1 | 11/2003 | Nakahara et al. | |
| 2003/0206373 A1 | 11/2003 | Kato et al. | |

* cited by examiner

*Primary Examiner*—A. Dexter Tugbang
*Assistant Examiner*—Tai Van Nguyen
(74) *Attorney, Agent, or Firm*—John J. Oskorep, Esq.; Rashod Nader (57) ABSTRACT

Methods suitable for use in making a write coil of a magnetic head includes the steps of forming a seed layer made of ruthenium (Ru) over a substrate; forming, over the seed layer, a patterned resist having a plurality of write coil trenches patterned therein; electroplating electrically conductive materials within the plurality of write coil trenches to thereby form a plurality of write coil layers; removing the patterned resist; and performing a reactive ion etch (RIE) in ozone gas ($O_3$) for removing exposed seed layer materials in between the plurality of write coil layers. Advantageously, the write coil layers remain undamaged from the RIE in the ozone gas. Other structures may be fabricated in a similar manner.

27 Claims, 8 Drawing Sheets

FIG. 10 (TMP) PRIOR ART

FIG. 11 (TMP) PRIOR ART

FIG. 12 (DAMASCENE) PRIOR ART

FIG. 13 (DAMASCENE) PRIOR ART

FIG. 14 (DAMASCENE) PRIOR ART

FIG. 15 (DAMASCENE) PRIOR ART

DEPOSIT Ru SEED LAYER

FIG. 18

FORM PATTERNED RESIST

FIG. 19

ELECTROPLATE COIL MATERIALS
WITHIN PATTERNED RESIST

REMOVE RESIST

FIG. 20

OZONE RIE TO REMOVE
EXPOSED Ru SEED MATERIALS

FIG. 21

FORM INSULATOR MATERIALS
AROUND COILS

FIG. 22

METHOD FOR USE IN MAKING A WRITE COIL OF MAGNETIC HEAD

BACKGROUND OF THE INVENTION

1. Field of the Invention

This invention relates generally to magnetic heads in disk drives, and more particularly to improved methods of making write coils of magnetic write heads as well as other structures with use of a ruthenium (Ru) seed layer for electroplating and a reactive ion etch (RIE) in ozone gas for seed removal.

2. Description of the Related Art

A write head is typically combined with a magnetoresistive (MR) read head to form a merged MR head, certain elements of which are exposed at an air bearing surface (ABS). The write head comprises first and second pole pieces connected at a back gap that is recessed from the ABS. The first and second pole pieces have first and second pole tips, respectively, which terminate at the ABS. An insulation stack, which comprises a plurality of insulation layers, is sandwiched between the first and second pole pieces, and a coil layer is embedded in the insulation stack. A processing circuit is connected to the coil layer for conducting write current through the coil layer which, in turn, induces write fields in the first and second pole pieces. A non-magnetic gap layer is sandwiched between the first and second pole tips. Write fields of the first and second pole tips at the ABS fringe across the gap layer. In a magnetic disk drive, a magnetic disk is rotated adjacent to, and a short distance (fly height) from, the ABS so that the write fields magnetize the disk along circular tracks. The written circular tracks then contain information in the form of magnetized segments with fields detectable by the MR read head.

It is important to reduce the size of various structures within the magnetic head to achieve higher bit densities. One component of importance is the write coil, where the distance between each write coil layer (i.e. the "pitch") has been reduced to 0.5 microns or less.

Figure 10:
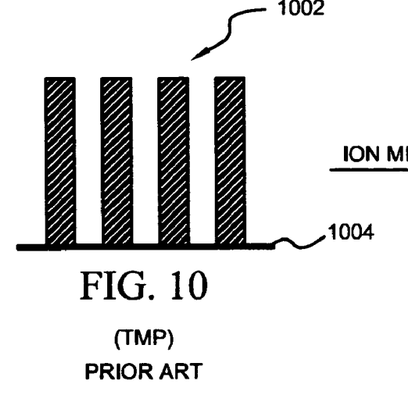
FIGS. 10–11 are illustrations pertaining to a conventional method of making a write coil of a magnetic head with use of electroplating and ion milling.
Figure 11:
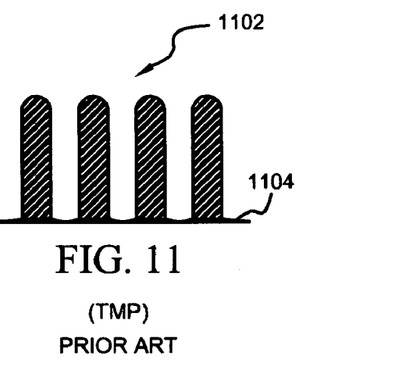

One conventional method of fabricating the write coil utilizes through-mask-plating (TMP), which is described in relation to FIGS. 10–11. In FIG. 10, a seed layer 1004 is deposited over a substrate and a plurality of write coil layers 1002 are formed over seed layer 1004. Seed layer 1004 is typically made of materials such as copper (Cu) or gold (Au). Write coil layers 1002 are typically copper (Cu) materials which have been electroplated with use of a patterned resist. For high aspect ratio structures, a problem arises when seed layer 1004 between each coil layer 1002 needs to be removed after the electroplating step.

One approach to remove seed layer 1004 between each coil layer 1002 is by ion milling, the result of which is shown in FIG. 11. After the ion milling, seed layer materials 1104 may not be fully removed and top portions of write coils 1102 may be damaged. Write coils 1102 may become electrically shorted. Note that it is difficult to etch the seed materials from the top of the structure in this manner, as the coil layers are relatively tall and the pitch between coil layers is narrow. With sputter etching (SE), the seed layer to be etched is immersed in a glow discharge where ions are accelerated across a sheath. Since the accelerated ions are not collimated, the process requires over-etching of the seed materials. The drawback to this approach is the increased depletion of the write coil thickness, which requires increasing the plating thickness of the write coils. Ion beam etching (IBE) is expected to have a tighter collimation of accelerated ions from a set of grids used to bias ions generated from confined plasma. Having a more efficient seed removal process, the IBE requires less over-etching of the seed materials. However, both SE and IBE approaches still have a number of shortcomings as the pitches are reduced. Namely, since the ejected species in both approaches are not inherently volatile, redeposition can occur and cause an electrical shorting of the write coils. Thus, since both techniques use purely physical processes to remove the seed materials, their selectivity is generally poor and over-etching tends to cause damage to the top coil structure and change the topography to the extent that it introduces more complications during subsequent fabrication steps.

Figure 12:
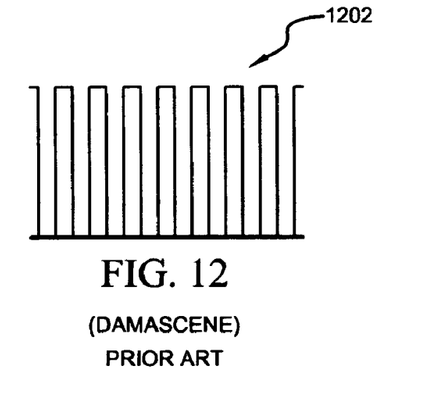
FIGS. 12–15 are illustrations pertaining to another conventional method of making a write coil of a magnetic head based on a damascene technique where a pitch between write coil layers is 0.5 microns or less.
Figure 13:
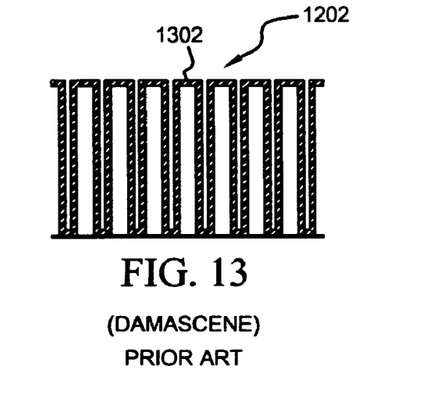
Figure 14:
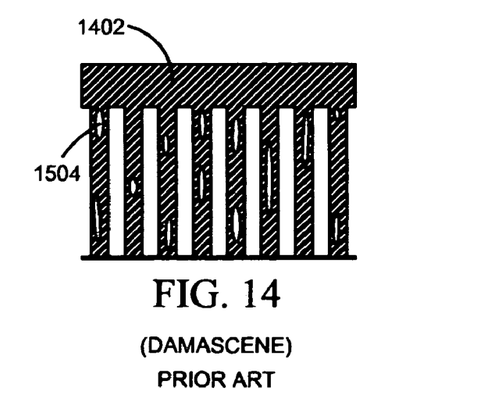
Figure 15:
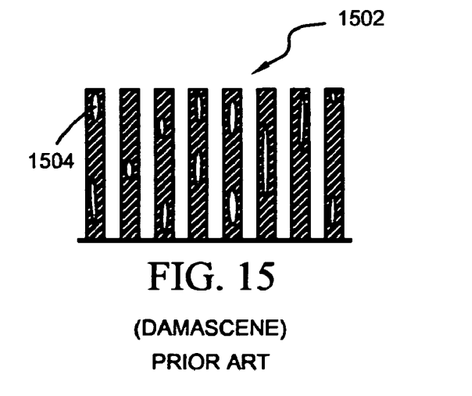

Another conventional method of fabricating the write coil utilizes a damascene technique, which is described in relation to FIGS. 12–15. In FIG. 12, a dielectric structure 1202 such as a patterned resist is formed with a plurality of trenches. In FIG. 13, a thin seed layer 1302 is deposited over the entire dielectric structure 1202 including within the trenches. Damascene electroplating of copper (Cu) 1402 is then performed within the trenches and over dielectric structure 1202 in FIG. 14 to form a plurality of write coil layers. Next, a planarization process such as a chemical-mechanical polishing (CMP) is performed over the structure to remove top excess portions of the copper, to result in a write coil structure 1502 of FIG. 15.

This damascene technique of FIGS. 12–15 is useful in many situations. When the write coil's aspect ratio increases (i.e. the pitch between coil layers is reduced), however, the damascene technique has its limitations. For example, fabrication issues become more apparent when the pitch between coil layers is 0.5 microns or less. For one, the seed layer deposition becomes non-uniform. In addition, the damascene filling within the trenches is also non-uniform and voids (e.g. a void 1504 in FIGS. 14–15) remain within the structure after the electroplating. Furthermore, the damascene technique for such high aspect ratio structures is limited to metals which do not produce hydrogen evolution during electroplating; thus the technique is not applicable to magnetic materials which are used to form other structures within a magnetic head.

Accordingly, there is a resulting need for a method of fabricating write coils and other structures so as to overcome the deficiencies of the prior art.

SUMMARY

Methods suitable for use in making a write coil of a magnetic head includes the steps of forming a seed layer made of ruthenium (Ru) over a substrate; forming, over the seed layer, a patterned resist having a plurality of write coil trenches patterned therein; electroplating electrically conductive materials within the plurality of write coil trenches to thereby form a plurality of write coil layers; removing the patterned resist; and performing a reactive ion etch (RIE) in ozone gas for removing exposed seed layer materials in between the plurality of write coil layers. Advantageously, the write coil layers remain undamaged from the RIE in ozone gas.

BRIEF DESCRIPTION OF THE DRAWINGS

For a fuller understanding of the nature and advantages of the present invention, as well as the preferred mode of use, reference should be made to the following detailed description read in conjunction with the accompanying drawings:

FIG. 16 is a flowchart for use in describing a method of making a write coil of a magnetic head in a disk drive (e.g. FIGS. 1–9) in accordance with the present application.

DETAILED DESCRIPTION OF THE PREFERRED EMBODIMENTS

The methods described herein are suitable for fabricating a write coil of a magnetic head where a pitch between coil layers is 0.5 microns or less. The method includes the steps of forming a seed layer made of ruthenium (Ru) over a substrate; forming, over the seed layer, a patterned resist having a plurality of write coil trenches patterned therein; electroplating electrically conductive materials within the plurality of write coil trenches to thereby form a plurality of write coil layers; removing the patterned resist; and performing a reactive ion etch (RIE) in ozone gas for removing exposed seed plurality materials in between the plurality of write coil layers. Advantageously, the plurality of write coil layers remain unetched from the RIE in ozone gas. Other structures may be fabricated in a similar manner.

The following description is the best embodiment presently contemplated for carrying out the present invention. This description is made for the purpose of illustrating the general principles of the present invention and is not meant to limit the inventive concepts claimed herein.

Figure 1:
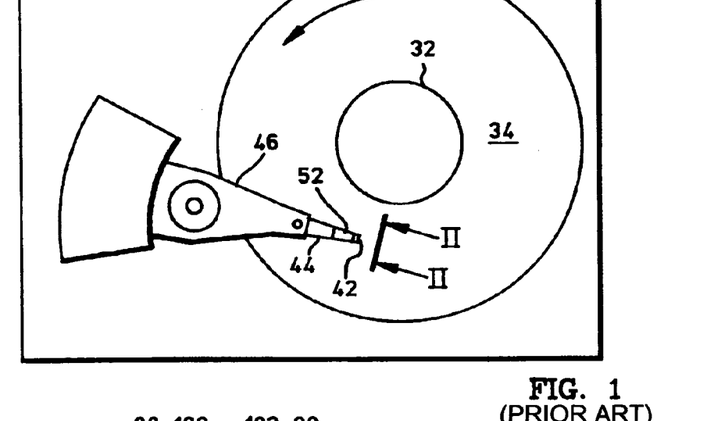
FIG. 1 is a planar view of an exemplary magnetic disk drive.
Figure 2:
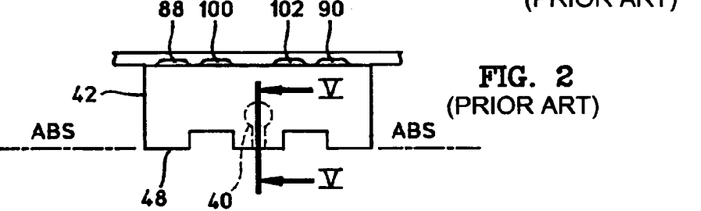
FIG. 2 is an end view of a slider with a magnetic head of the disk drive as seen in plane II—II.
Figure 3:
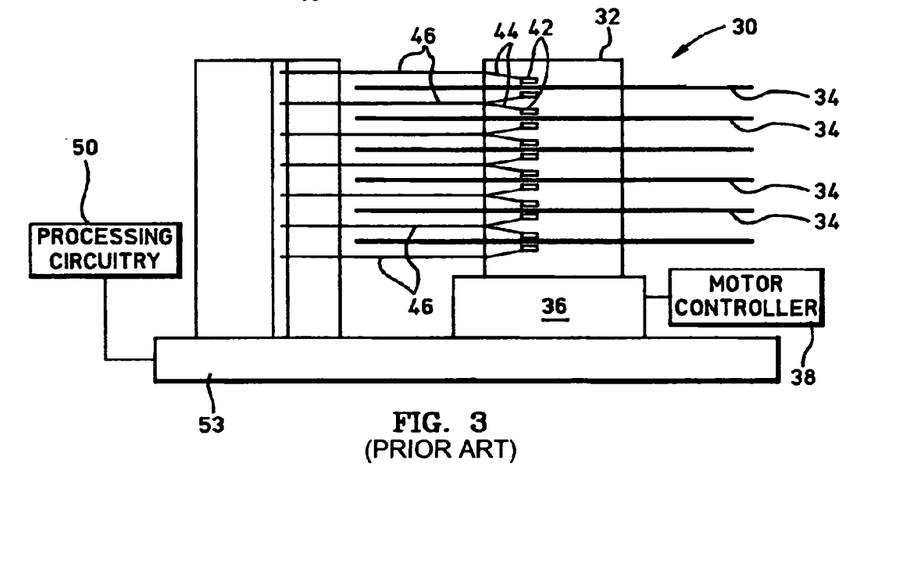
FIG. 3 is an elevation view of the magnetic disk drive wherein multiple disks and magnetic heads are employed.

Referring now to the drawings, wherein like reference numerals designate like or similar parts throughout the several views, there is illustrated in FIGS. 1–3 a conventional magnetic disk drive 30. Disk drive 30 includes a spindle 32 that supports and rotates a magnetic disk 34. Spindle 32 is rotated by a motor 36 that, in turn, is controlled by a motor controller 38. A horizontal combined magnetic head 40 for reading and recording is mounted on a slider 42.

The methods of the present application may be utilized to make one or more structures (e.g. a write coil) within magnetic head 40. Slider 42 is supported by a suspension 44 and actuator arm 46. A plurality of disks, sliders and suspensions may be employed in a large capacity direct access storage device (DASD), as shown in FIG. 3. Suspension 44 and actuator arm 46 position slider 42 to locate magnetic head 40 in a transducing relationship with a surface of magnetic disk 34. When disk 34 is rotated by motor 36, slider 42 is supported on a thin (typically, 0.05 μm) cushion of air (air bearing) between the disk and an air bearing surface (ABS) 48.

Figure 4:
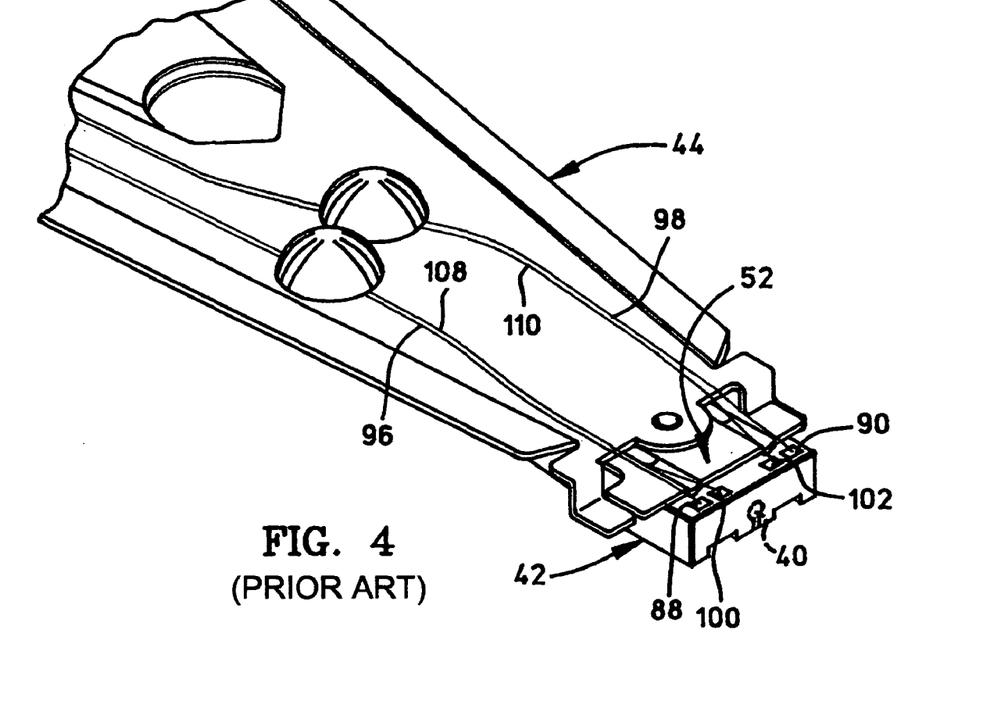
FIG. 4 is an isometric illustration of an exemplary suspension system for supporting the slider and magnetic head.

Magnetic head 40 may be employed for writing information to multiple circular tracks on the surface of disk 34, as well as for reading information therefrom. Processing circuitry 50 exchanges signals representing such information with magnetic head 40, provides motor drive signals, and also provides control signals for moving slider 42 to various tracks. In FIGS. 1 and 4, slider 42 is shown mounted to a head gimbal assembly (HGA) 52 that is mounted to suspension 44. All of the above components are supported on a base 53.

Figures 5, 7:
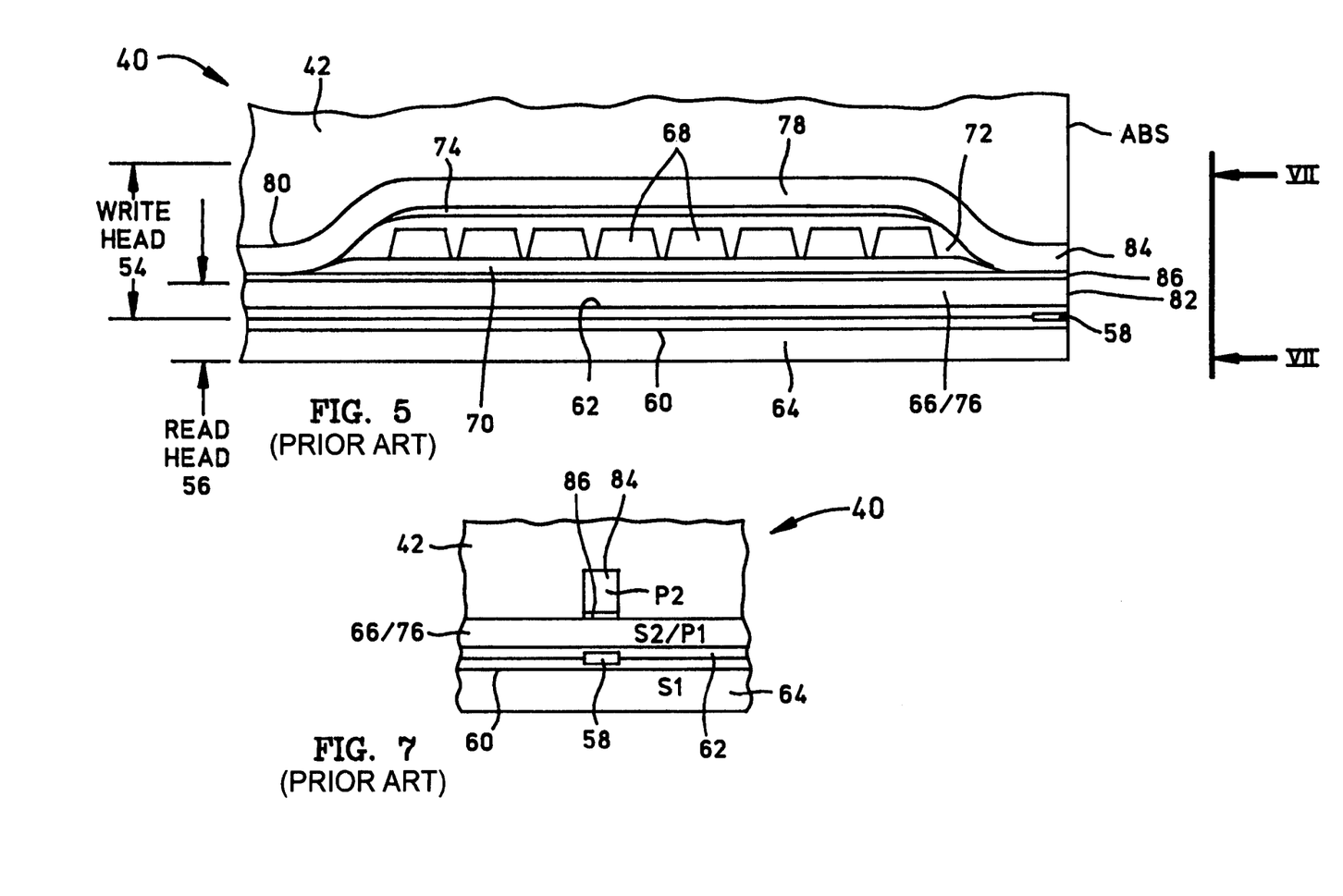
FIG. 5 is a partial elevation view of the slider and magnetic head as seen in plane V—V of FIG. 2, where the magnetic head includes a magnetoresistive (MR) read sensor and a non-pedestal type write head.
FIG. 7 is a partial ABS view of the slider taken along plane VII—VII of FIG. 5 to show the read and write elements of the magnetic head.

FIG. 5 is a side cross-sectional elevation view of a conventional merged magnetoresistive (MR) head 40 as viewed in plane V—V of FIG. 2. Magnetic head 40 has a write head portion 54 ("non-pedestal type") and a read head portion 56. The read head portion includes an MR sensor 58. MR sensor 58 is sandwiched between first and second gap layers 60 and 62 that are, in turn, sandwiched between first and second shield layers 64 and 66. In response to external magnetic fields, the resistance of MR sensor 58 changes. A sense current conducted through MR sensor 58 causes these resistance changes to be manifested as potential changes, which are processed by the processing circuitry 50 shown in FIG. 3.

Figure 6:
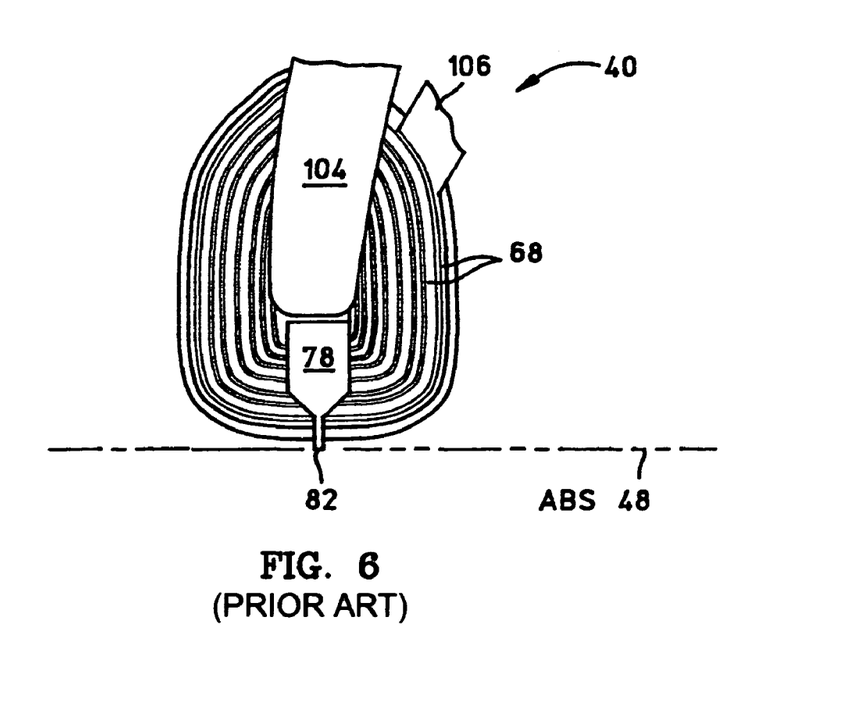
FIG. 6 is a top view of the second pole piece and coil layer, a portion of which is shown in FIG. 5, with all insulation material removed.

Write head portion 54 of the head includes a coil layer 68 sandwiched between first and second insulation layers 70 and 72. First and second insulation layers 70 and 72 are referred to as an "insulation stack". Coil layer 68 and first and second insulation layers 70 and 72 are sandwiched between first and second pole pieces 76 and 78. First and second pole pieces 76 and 78 are magnetically coupled at a back gap 80, and have first and second pole tips 82 and 84 that are separated by a non-magnetic gap layer 86 at the ABS. Note that coil layer 68 is contained completely above non-magnetic gap layer 86 under and within second pole piece 78. As shown in FIGS. 2 and 4, first and second solder connections 88 and 90 connect leads (not shown) from MR sensor 58 to leads 96 and 98 on suspension 44; third and fourth solder connections 100 and 102 connect leads 104 and 106 from write coil 68 (see FIG. 6) to leads 108 and 110 on suspension 44.

Figure 8:
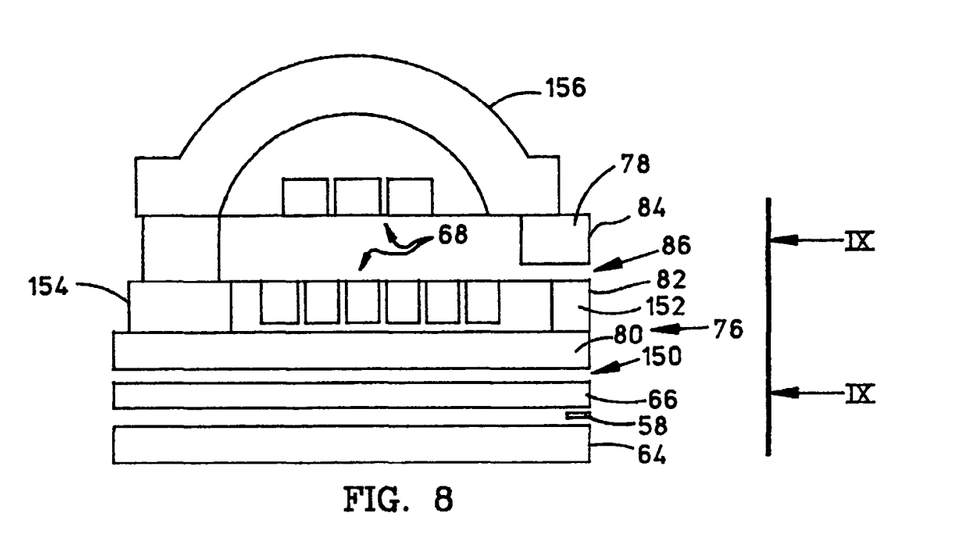
FIG. 8 is a partial elevation view of the slider and magnetic head as seen in plane V—V of FIG. 2, where the magnetic head includes an MR or giant magnetoresistive (GMR) read sensor and a pedestal-type write head.
Figure 9:
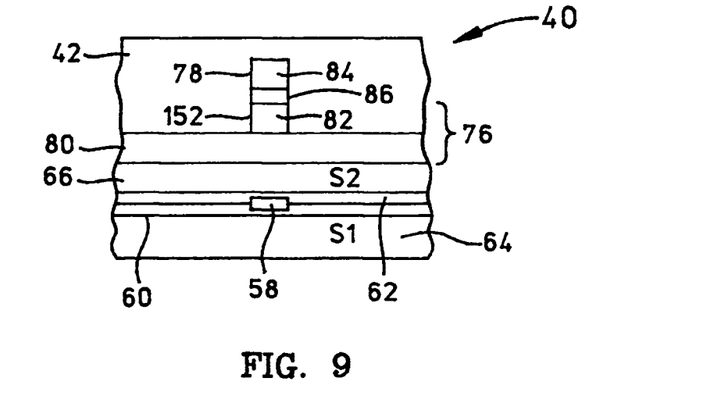
FIG. 9 is a partial ABS view of the slider taken along plane IX—IX of FIG. 8 to show the read and write elements of the magnetic head of FIG. 8.

FIG. 8 is a partial cross-sectional view of another conventional slider and magnetic head ("pedestal type") as viewed in plane V—V of FIG. 2, where the magnetic head may include an MR or a GMR sensor. FIG. 9 is a partial ABS view of the slider taken along plane IX—IX of FIG. 8 to show read and write elements of this magnetic head. Although many components in this magnetic head are the same as those in FIG. 5, some differences are apparent. For one, the head in FIG. 8 includes a pedestal-type write head wherein first pole piece 76 includes a first pole piece layer 80 and a plated pedestal 152. Pedestal 152 is formed on first pole piece layer 80 by electroplating and is made of a magnetic material having a high magnetic moment. Non-magnetic gap layer 86 separates pedestal 152 from second pole piece 78. Similar to pedestal 152, a back gap pedestal 154 is formed on first pole piece layer 80 but in the back gap region. A third pole piece 156, which is formed in an arcuate fashion with a front end formed on top of second pole piece 78, serves as a magnetic flux connecting layer. Conventional write coils 68 of FIG. 8 are formed within the magnetic head in a different manner than that in FIG. 5. In particular, a first layer of coil turns are formed below non-magnetic gap layer 86 in between pedestals 152 and 154 and a second layer of coil turns are formed above second pole piece 78 within an arcuate spacing formed by third pole piece 156. Other differences from that in FIG. 5 are that shield layer 66 and first pole piece layer 80 are not common layers; they are separate. A non-magnetic separating layer 150 is formed between shield layer 66 and first pole piece layer 80.

Figure 16:
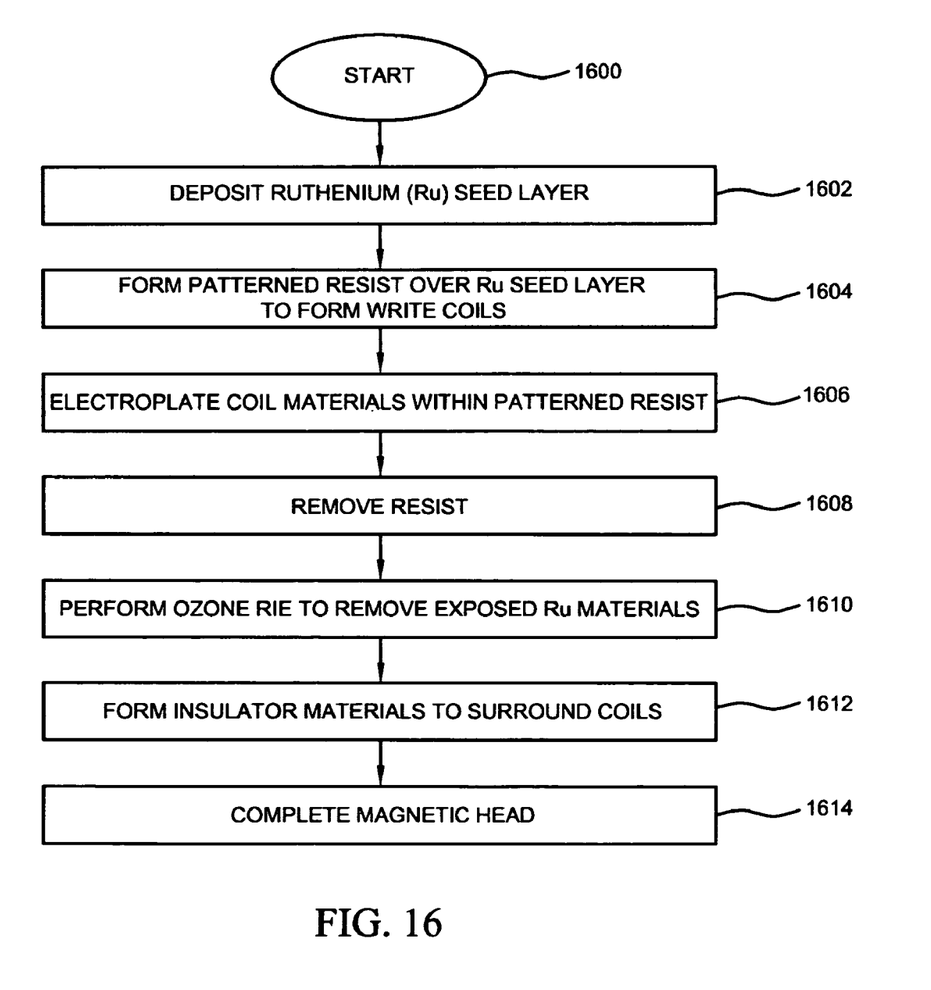

FIG. 16 is a flowchart for use in describing a method of making a write coil of a magnetic head in accordance with the present application. The flowchart of FIG. 16 is referred to in combination with FIGS. 17–22 which are cross-sectional views of partially constructed magnetic heads for use in describing the steps in the flowchart. The method may be used to make one or more structures (e.g. a write coil) of the magnetic head in the disk drive described in relation to FIGS. 1–9.

Figure 17:
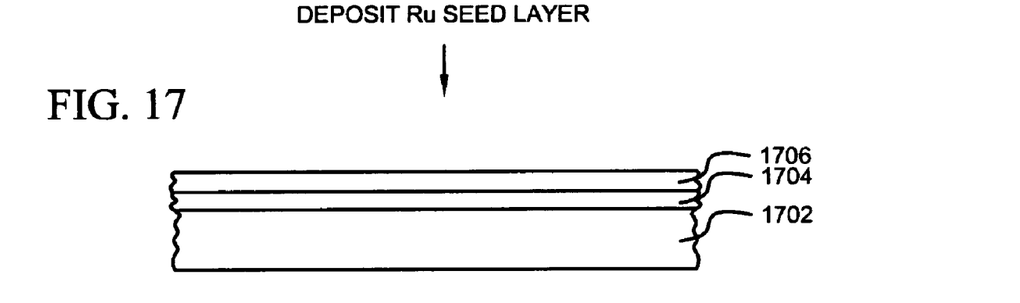
FIGS. 17–22 are cross-sectional views of partially constructed magnetic heads for use in describing the steps in the flowchart of FIG. 16.

The method begins at a start block 1600 of FIG. 16 and the first cross-sectional view in FIG. 17. In FIG. 17, a seed layer 1706 made of ruthenium (Ru) is deposited over a substrate (step 1602 of FIG. 16). The substrate may be any suitable substrate and, in FIG. 17, seed layer 1706 is formed over an insulator layer 1704 (e.g. $Al_2O_3$) which is formed over a pole piece layer 1702 (e.g. magnetic materials such as NiFe or CoFe) of a magnetic write head. Seed layer 1706 may be formed with a thickness of between about 500 and 1500 Angstroms. Preferably, seed layer 1706 is pure ruthenium (Ru); however, other alternatives may be utilized such as osmium (Os).

Figure 18:
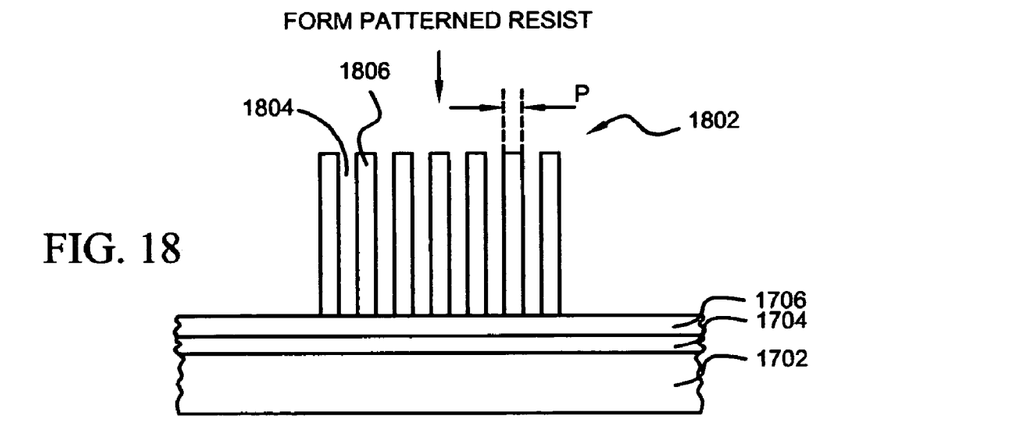

In FIG. 18, a patterned resist 1802 having a plurality of trenches is formed over seed layer 1706 (step 1604 of FIG. 16). Each trench 1804 extends down through patterned resist 1802 until seed layer 1706 is reached; seed layer 1706 is exposed at a bottom of each trench 1804. Each resist separating layer 1806 which separates each trench 1804 from one another has a pitch P or width as depicted in FIG. 18. In the present example, the pitch P or width is 0.5 microns or less. The thickness or height of each trench 1804 may be between 1 and 15 um. Given these dimensions, the write coil to be formed will be a high-aspect ratio structure. In the example shown in FIG. 18, it is illustrated that six (6) trenches 1804 are formed within patterned resist 1802; however more or less trenches may be formed depending on the application.

Patterned resist 1802 may be a photoresist made of, for example, a polyphenolic polymer or polyvinylphenol. Polyphenolic polymer is a copolymer of phenol and formaldehyde and is also known commercially as Novolak, which can be purchased from Hoechst Celanese, Sumitomo, or Shipley. To form patterned resist 1802, a full thin film of resist is initially formed over seed layer 1706. This thin film of resist is light-exposed in regions which are to be removed, provided the resist is a positive resist. If the resist is a negative resist, it is light-exposed in regions that are to be retained. Next, the resist is subjected to a basic developer solution. The developer used may be, for example, aqueous potassium hydroxide (KOH) developer, such as 1:6 2401 (Shipley) or 1:4 AZ 400 K (Hoechst Celanese) wherein the ratios are the developer-to-water. In a 1:6 2401 developer, the develop time can be up to 3 minutes for the purpose of removing light-exposed resist portions. Other basic aqueous developers may be utilized as well, such as 2.38% tetramethylammonium hydroxide (TMAH).

Figure 19:
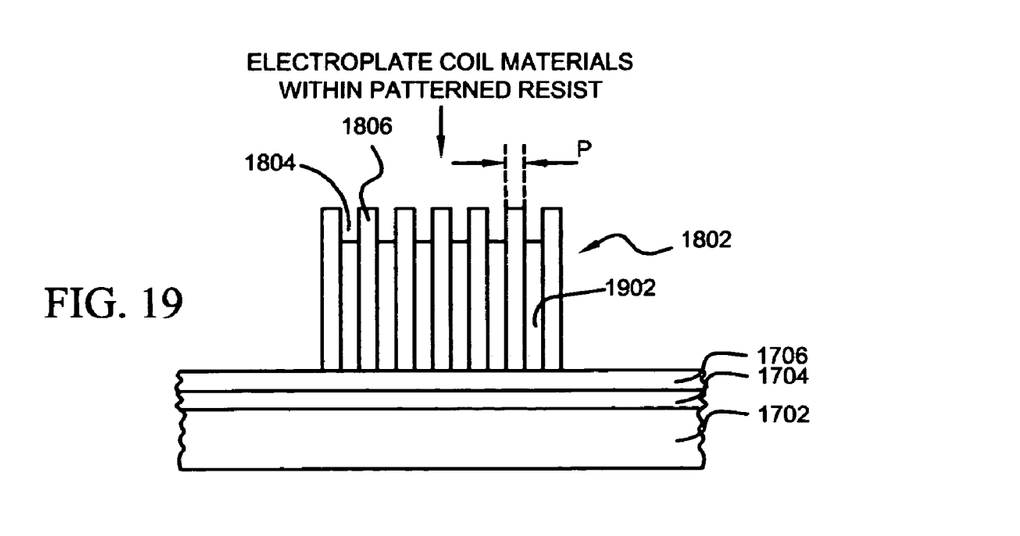
Figure 20:
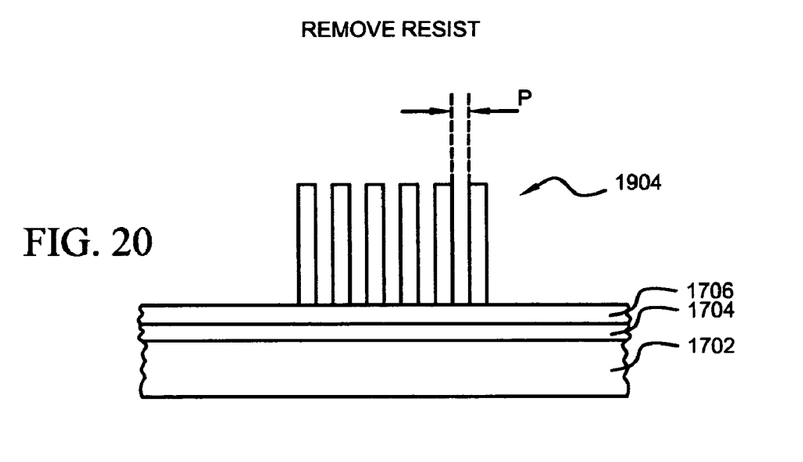

In FIG. 19, electrically conductive materials 1902 are then electroplated within patterned resist 1802 (step 1606 of FIG. 16). This electroplating technique may generally be referred to as through-mask-plating (TMP). Using this process, electrically conductive materials 1902 formed within each trench 1802 make contact with seed layer 1706 at the bottom of each trench 1802. In this embodiment, electrically conductive materials 1902 are preferably copper (Cu) although any suitable conductive materials may be utilized such as gold (Au), silver (Ag), or alloys thereof. Alternatively, materials 1902 may be other materials depending on the application; for example, materials 1902 may be magnetic materials such as NiFe or CoFe if pole pieces are to be fabricated with use of the present method. In FIG. 20, patterned resist 1802 is removed with use of a suitable solvent (step 1608 of FIG. 16) to reveal a plurality of write coil layers 1904. Note that seed layer 1706 remains intact underneath write coil layers 1904 and is exposed in the side regions as well as in between each write coil layer 1904. Each write coil layer 1904 still remains separated by a pitch or width as depicted in the drawing.

Figure 21:
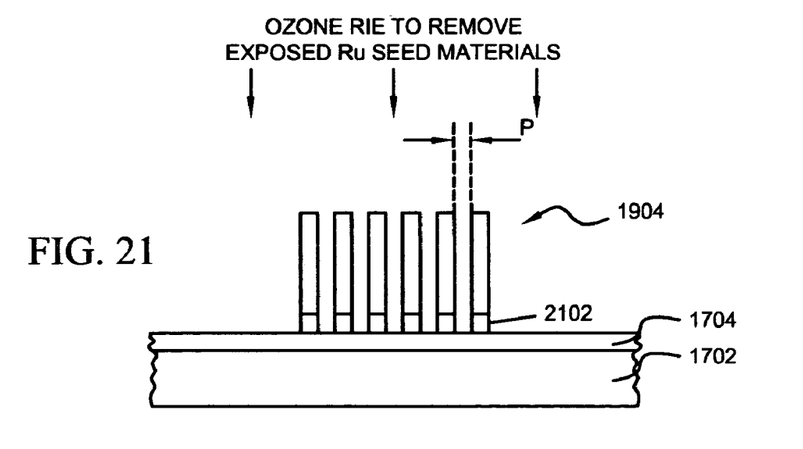

In FIG. 21, the exposed seed materials are removed with use of a reactive ion etch (RIE) in ozone gas (step 1610 of FIG. 16). In this RIE approach, a plasma is sparked in the ozone gas ($O_3$) by a radio frequency (RF) source which decomposes to form a species capable of reacting directly with the exposed seed layer materials. The reaction produces volatile compounds, such as $RuO_4$ and $RuO_3$, which causes a selective removal of the seed layer materials. The RIE with ozone gas ($O_3$) is selective to ruthenium and does not etch materials of write coil layer 1904. Therefore, the geometry for the write coil does not change (or is insignificantly changed). Note that outside surfaces of write coil layer 1904 may become oxidized to produce a thin oxidized copper layer, but this poses no significant issues. The RIE is performed until each coil layer 1904 is electrically separated from each adjacent coil layer, and preferably until all seed layer materials in between each coil layer 1904 are removed. A reasonable etch rate of between about 500–3000 Angstroms/minute may be achieved using this process. Note that some seed materials 2102 that were not exposed remain formed underneath each coil layer 1904.

Figure 22:
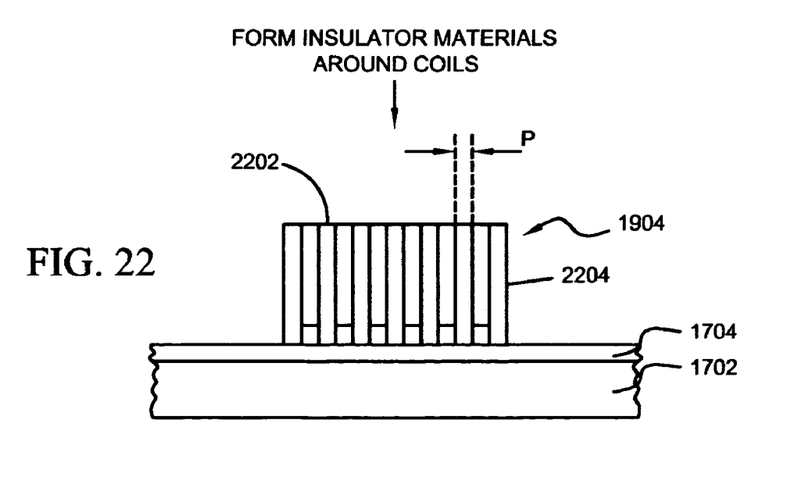

In FIG. 22, insulator materials 2202 are then deposited in between coil layers 1904 to form a plurality of coil separation layers (step 1612 of FIG. 16). Insulator materials 2202 may be any suitable non-conductive dielectric materials such as alumina ($Al_2O_3$) or hard-baked photoresist. A write coil structure 2204 is thereby fabricated. Note that the pitch or width between write coil layers 1904 is depicted as the width of each newly formed coil separating layer, as shown in the drawing. After the deposition of insulator materials 2202, a planarization process such as a chemical-mechanical polishing (CMP) may be subsequently performed to form a top planarized surface over write coil structure 2204. Subsequent processing steps, conventional or otherwise, may be utilized to complete the formation of the magnetic head (step 1614 of FIG. 16). For example, additional insulator materials may be deposited to surround and protect the write coil and additional pole piece components may be formed over the write coil (e.g. see FIG. 8).

Advantageously, a write coil is fabricated with no damage to its top portion due to etching the seed layer materials. The likelihood of electrical shorting the write coil is substantially reduced or eliminated. Note that this technique is not limited to fabrication of the write coils and may apply to the fabrication of magnetic pole piece components including pole piece layers and pedestals (e.g. see FIGS. 6–9), for example. To fabricate a magnetic pedestal, for example, the method may include the steps of forming a ruthenium (Ru) seed layer over a substrate; forming a patterned resist having a pedestal trench over the Ru seed layer; electroplating magnetic materials within the pedestal trench to form the pedestal; removing the patterned resist; and performing a RIE in ozone gas ($O_3$) to remove Ru seed layer materials exposed outside the electroplated pedestal.

Final Comments. Methods suitable for use in making a write coil of a magnetic head have been described. One illustrative embodiment of making a write coil includes the steps of forming a seed layer made of ruthenium (Ru) over a substrate; forming, over the seed layer, a patterned resist having a plurality of write coil trenches patterned therein; electroplating electrically conductive materials within the plurality of write coil trenches to thereby form a plurality of write coil layers; removing the patterned resist; and performing a reactive ion etch (RE) in ozone gas for removing exposed seed layer materials in between the plurality of write coil layers. Advantageously, the write coil layers remain undamaged from the RIE in ozone gas. A more general method for forming an electroplated structure includes the steps of forming a seed layer comprising ruthenium over a substrate; forming, over the seed layer, a patterned resist having one or more trenches patterned therein; electroplating materials within the one or more trenches to form one or more electroplated structures; removing the patterned resist; and performing a RIE in ozone gas for removing exposed seed layer materials.

It is to be understood that the above is merely a description of preferred embodiments of the invention and that various changes, alterations, and variations may be made without departing from the true spirit and scope of the invention as set for in the appended claims. Few if any of the terms or phrases in the specification and claims have been given any special particular meaning different from their plain language meaning, and therefore the specification is not to be used to define terms in an unduly narrow sense.

What is claimed is:

1. A method for use in making a write coil of a magnetic head, comprising:
    forming a seed layer comprising ruthenium (Ru) over a substrate;
    forming, over the seed layer, a patterned resist having a plurality of write coil trenches patterned therein;
    electroplating electrically conductive materials within the plurality of write coil trenches to thereby form a plurality of write coil layers;
    removing the patterned resist; and
    performing a reactive ion etch (RIE) in ozone gas for removing exposed seed layer materials in between the plurality of write coil layers.

2. The method of claim 1, wherein a pitch between the coil layers is 0.5 microns or less.

3. The method of claim 1, wherein the write coil layers remain unetched from the RIE in ozone gas.

4. The method of claim 1, wherein a volatile compound including at least one of $RuO_4$ and $RuO_3$ is produced from the RIE in ozone gas.

5. The method of claim 1, wherein the electrically conductive materials comprise copper (Cu).

6. The method of claim 1, wherein the seed layer is formed over an insulator layer.

7. The method of claim 1, wherein the seed layer is formed over a pole piece layer of the magnetic head.

8. The method of claim 1, further comprising:
    forming a plurality of insulator layers in between the plurality of write coil layers.

9. The method of claim 1, wherein the seed layer consists of ruthenium (Ru).

10. A method for use in forming an electroplated structure, comprising:
    forming a seed layer comprising ruthenium (Ru) over a substrate;
    forming, over the seed layer, a patterned resist having one or more trenches patterned therein;
    electroplating materials within the one or more trenches to form one or more electroplated structures;
    removing the patterned resist; and
    performing a reactive ion etch (RIE) in ozone gas for removing exposed seed layer materials.

11. The method of claim 10, wherein a pitch between the one or more trenches is 0.5 microns or less.

12. The method of claim 10, wherein the one or more electroplated structures remain unetched from the RIE in ozone gas.

13. The method of claim 10, wherein a volatile compound including at least one of $RuO_4$ and $RuO_3$ is produced from the RIE in ozone gas.

14. The method of claim 10, wherein the electroplated materials comprise copper (Cu).

15. The method of claim 10, wherein the electroplated materials comprise magnetic materials.

16. The method of claim 10, wherein the seed layer is formed over an insulator layer.

17. The method of claim 10, wherein the seed layer is formed over a pole piece layer of a magnetic head.

18. The method of claim 10, wherein the seed layer consists of ruthenium (Ru).

19. A magnetic head having a write coil formed by a method comprising the steps of:
    forming a seed layer comprising ruthenium (Ru) over a substrate;
    forming, over the seed layer, a patterned resist having a plurality of write coil trenches patterned therein;
    electroplating electrically conductive materials within the plurality of write coil trenches to thereby form a plurality of write coil layers;
    removing the patterned resist; and
    performing a reactive ion etch (RIE) in ozone gas ($O_3$) for removing exposed seed layer materials in between the plurality of write coil layers.

20. The magnetic head of claim 19, wherein a pitch between the coil layers is 0.5 microns or less.

21. The magnetic head of claim 19, wherein the write coil layers remain unetched from the RIE in ozone gas.

22. The magnetic head of claim 19, wherein a volatile compound including at least one of $RuO_4$ and $RuO_3$ is produced from the RIE in ozone gas.

23. The magnetic head of claim 19, wherein the electrically conductive materials comprise copper (Cu).

24. The magnetic head of claim 19, wherein the seed layer is formed over an insulator layer.

25. The magnetic head of claim 19, wherein the seed layer is formed over a pole piece layer of the magnetic head.

26. The magnetic head of claim 19, further comprising:
    forming a plurality of insulator layers in between the plurality of write coil layers.

27. The magnetic head of claim 19, wherein the seed layer consists of ruthenium (Ru).

* * * * *